UNITED STATES PATENT OFFICE 2,670,348

GIRARD DERIVATIVES OF 5-HALO-SALICYLALDEHYDES

Walter A. Gregory, Wilmington, and Edward C. Hermann, Willow Run, Wilmington, Del., assignors to E. I. du Pont de Nemours and Company, Wilmington, Del., a corporation of Delaware No Drawing. Application June 10, 1952,
Serial No. 292,736

5 Claims. (Cl. 260—240)

This invention relates to water-soluble substituted hydrazones of salicylaldehyde. It is more particularly directed to 2-hydroxy-5-inorgano-substituted benzaldehyde carboxymethyl quaternary ammonium halide hydrazide hydrazones and their solvates and to a method for their preparation.

This application is a continuation-in-part of our copending application Serial No. 227,119 filed May 18, 1951, now abandoned.

The substituted salicylaldehyde carboxymethyl quaternary ammonium halide hydrazide hydrazones of the invention are represented by the formula 1.
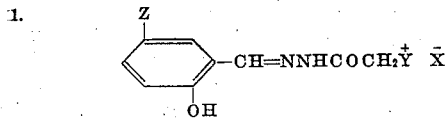

where Z is a halogen radical, Y is a quaternary ammonium radical of the class consisting of trimethylammonium, triethylammonium, pyridinium and morpholinium, and X is a member of the group consisting of chlorine and bromine.

The compounds of the invention are prepared by reacting in liquid media a substituted salicylaldehyde represented by the formula 2.
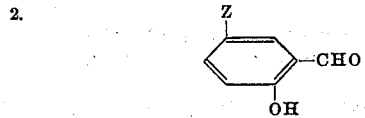

where Z has the same significance as in Formula 1 with an aminoacetohydrazide hydrohalide represented by the formula 3.
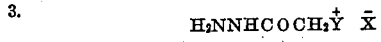

where Y and X have the same significance as stated above.

The aminoacetohydrazide hydrohalides used in the preparation of the compounds of the invention and represented by Formula 3 are preferably Girard's T reagent or Girard's P reagent. Both of these reagents are commercially available.

Girard's T reagent (trimethylaminoacetohydrazide hydrochloride, also known as betaine hydrazide hydrochloride) can be readily prepared by reacting ethyl chloroacetate and trimethylamine with hydrazine hydrate by the procedure described on page 85 of "Organic Syntheses," collective volume 2, John Wiley & Sons Inc., New York, 1943.

Girard's P reagent may be prepared in a manner identical with the method employed for preparing Girard's T reagent with the exception that pyridine is substituted for trimethylamine. Girard's P reagent can be represented graphically by Formula 3, where Y is a pyridinium radical.

The substituted salicylaldehydes used in the preparation of the compounds of our invention contain an inorganic substituent such as halogen in the 5-position. Suitable substituted salicylaldehydes are 5-chlorosalicylaldehyde, 5-bromosalicylaldehyde, 5-iodosalicylaldehyde, and 5-fluorosalicylaldehyde.

The reaction between the substituted salicylaldehyde and the aminoacetohydrazide hydrohalide is most readily carried out in liquid media. While any of a wide variety of normally liquid alcohols and acetic acid-alcohol mixtures may be used, it is preferred to employ an aliphatic monohydric lower alcohol, such as, for instance, methanol, propanol, isopropanol, butanol and the like. Hot absolute ethanol is a particularly preferred solvent for the substituted salicylaldehydes. Alcohol-acetic acid mixtures are preferred solvents for the aminoacetohydrazide hydrohalides.

As catalysts for the reaction between the substituted salicylaldehyde and the aminoacetohydrazide, there may be used any aliphatic monocarboxylic acid. Such acids include acetic, propionic, butyric, valeric and the like. Glacial acetic acid is preferred.

The slightly exothermic reaction between the aldehyde and Girard reagent may also be facilitated by moderate heating, say, by maintaining the reaction mixture at a temperature of from about 60° to 100° C. The precise temperature employed will, of course, depend upon the particular reactants and solvent. As a practical matter, the reaction is usually carried out at or slightly under the boiling point of the solvent.

Usually a reaction period of from 15 minutes to several hours is required, but in some cases the reaction may go to completion within a short time even at room temperature.

The solvates of the compounds of our invention are obtained by simply crystallizing the compounds from solvents. The preferred solvents for crystallization of our novel water-soluble compounds are the lower alkanols, such as, for instance, methanol, ethanol, propanol and the like. Of these we particularly prefer ethanol.

While the alcoholic solvates are most frequently prepared, other solvates, for instance, the hydrates, may be prepared. The term "solvate" is used herein to include all states of solvation.

There may be prepared, for instance, the hemisolvate, the monosolvate, the disolvate, the trisolvate and the like.

Conversion of the solvates of the compounds of the invention to the compounds themselves is readily effected by treatment of the solvate with a liquid aromatic hydrocarbon, preferably benzene. The product which separates from the benzene suspension of the solvate after a period of heating is substantially free of any alcohol of solvation.

The compounds of the present invention are light colored crystalline solids. They are, in general, soluble in water, methanol, and acetic acid but insoluble in acetone and ether.

The 5-halosalicylaldehyde carboxymethyl quaternary ammonium halide hydrazide hydrazones and their solvates are particularly valuable because of their curative and systemic fungicidal properties. The compounds of the invention have also given evidence as bactericides and protozoacides and are useful in the treatment of cecal coccidiosis in chickens.

In order to more fully understand the invention reference should be had to the following illustrative examples. Parts are by weight unless otherwise expressed.

Example 1

(Carboxymethyl) trimethylammonium chloride, hydrazide and hydrazone with 5-chlorosalicylaldehyde

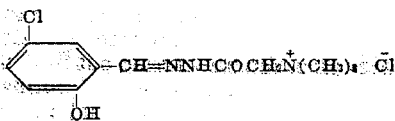

To a solution of 15.7 parts of 5-chlorosalicylaldehdye in 19.7 parts of boiling absolute ethanol, there was added a warm solution consisting of 18.4 parts of Girard's T reagent, 134 parts of absolute ethanol and 17.8 parts of glacial acetic acid. The resulting mixture was heated under reflux for a period of about one-half hour. The solution was treated with Darco and was filtered while still hot. The solid product, which separated on cooling the resulting filtrate, was collected, washed well with absolute ethanol, then with ether and finally dried. The product so obtained had a melting point of 252° C. (dec.).

Anal.—Calcd. for $C_{14}H_{17}Cl_2N_3O_2$: N, 13.72; Found: N, 13.57.

Example 2

1-carboxymethylpyridinium chloride, hydrazide and hydrazone with 5-chlorosalicylaldehyde

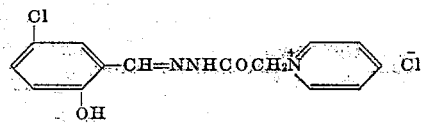

To a solution of 15.7 parts of 5-chlorosalicylaldehyde in 39.5 parts of boiling absolute ethanol, there was added 20.0 parts of Girard's P reagent dissolved in a mixture consisting of 197 parts of absolute ethanol and 52.5 parts of glacial acetic acid. The resulting solution was heated at reflux temperature for a period of one-half hour. The hot solution was then treated with Darco and filtered. The filtrate was cooled in an ice water bath. The crystalline product which separated on cooling was collected on a filter, washed with three 28-part portions of absolute ethanol and two 25-part portions of ether. The product was air-dried at room temperature and weighed 32 parts. It melted with decomposition at 245° C.

Anal.—Calcd. for $C_{14}H_{13}Cl_2N_3O_2 + C_2H_5OH$: N, 11.29; Found: N, 11.49.

Example 3

(Carboxymethyl) trimethylammonium chloride, hydrazide and hydrazone with 5-bromosalicylaldehyde

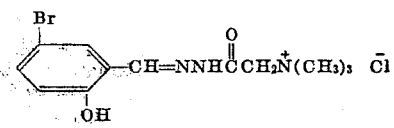

To a boiling solution of 20.1 parts of 5-bromosalicylaldehyde and 20 parts of absolute ethanol was added a hot solution of 18.4 parts of Girard's T reagent in a mixture of 134 parts of absolute ethanol, and 18 parts of glacial acetic acid. A white solid precipitated almost at once (1 minute). The resulting solution was heated under reflux for one-half hour and then cooled. The product was collected on a filter and washed three times with 20 parts of absolute ethanol and twice with 32-part portions of ether. The crude product was air-dried. Yield, 34 parts, M. P. 250° (dec.).

Anal.—Calcd. for $C_{12}H_{17}N_3O_2ClBr$: N, 11.98; Found: N, 11.70.

Example 4

Two parts of the ethanol monosolvate of 1-(carboxymethyl) pyridinium chloride, hydrazide and hydrazone with 5-chlorosalicylaldehyde (produced as in Example 2) was suspended in 88 parts of benzene. Fifty-three parts of benzene was then removed by distillation through a packed column. The solid was separated from the residual suspension by filtration, collected and air-dried. The dry product melted at 229–230° C. and was substantially free of alcohol of solvation.

Anal.—Calcd. for $C_{14}H_{13}N_3O_2Cl$: N, 12.88; Found: N, 12.81.

Also illustrative of the compounds of our invention are:

(Carboxymethyl) triethylammonium chloride, hydrazide and hydrazone with 5-chlorosalicylaldehyde 1-carboxymethylmorpholinium chloride, hydrazide and hydrazone with 5-chlorosalicylaldehyde (Carboxymethyl) trimethylammonium bromide, hydrazide and hydrazone with 5-chlorosalicylaldehyde (Carboxymethyl) trimethylammonium chloride, hydrazide and hydrazone with 5-chlorosalicylaldehyde (Carboxymethyl) trimethylammonium chloride, hydrazide and hydrazone with 5-iodosalicylaldehyde.

We claim:

1. A compound selected from the group consisting of 2-hydroxy-5-inorgano-benzaldehyde carboxymethyl quaternary ammonium halide hydrazide hydrazones represented by the formula

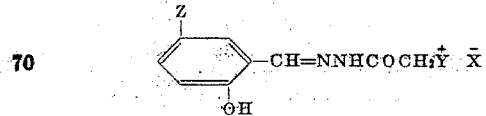

and their hydroxylic solvates, where Z is a halogen radical, Y is a quaternary ammonium radical of the class consisting of trimethylammonium, triethylammonium, pyridinium and morpholinium, and X is a member of the group consisting of chlorine and bromine.

2. 1-Carboxymethylpyridinium chloride, hydrazide and hydrazone with 5-chlorosalicylaldehyde, said compound having the formula

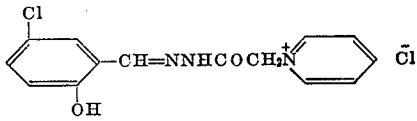

3. (Carboxymethyl)trimethylammonium chloride, hydrazide and hydrazone with 5-chlorosalicylaldehyde, said compound having the formula

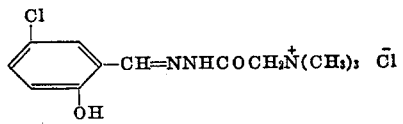

4. (Carboxymethyl)trimethylammonium chloride, hydrazide and hydrazone with 5-bromosalicylaldehyde, said compound having the formula

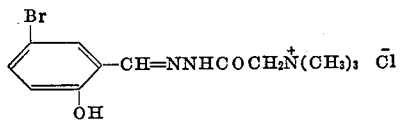

5. A process for the preparation of a substituted salicylaldehyde carboxymethyl quaternary ammonium halide hydrazide hydrazone represented by the formula

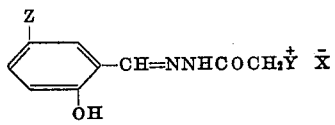

where Z is a halogen radical, Y is a quaternary ammonium radical of the group consisting of trimethylammonium, triethylammonium, pyridinium and morpholinium, and X is a member of the group consisting of chlorine and bromine, which comprises reacting substituted salicylaldehyde having the formula

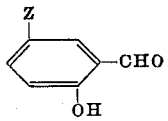

where Z have the same significance as above, with an aminoacetohydrazide hydrohalide represented by the formula

where Y and X have the same significance as above, in a liquid medium.

WALTER A. GREGORY.
EDWARD C. HERMANN.

References Cited in the file of this patent
UNITED STATES PATENTS

| Number | Name | Date |
|---|---|---|
| 2,536,100 | Shappirio | Jan. 2, 1951 |

OTHER REFERENCES

Lederer, "Travaux. Soc. Chim. Biol. Pays Bas," vol. 24 (1942), pp. 1148 to 1154.

Lederer, "Bull. Soc. Chim. France," vol. 13 (Series 5) (1946), page 172.

Lederer et al., "Bull. Soc. Chim. France," 1949, pp. 400 to 402.

Girard et al., "Helv. Chim. Acta," vol. 19 (1936), pp. 1095 to 1107.

Ward, "J. Am. Pharm. Assoc.," vol. 37 (1948), pp. 317 to 319.